No. 886,526.
PATENTED MAY 5, 1908.
W. L. MARR.
CARBURETER.
APPLICATION FILED APR. 9, 1906.
2 SHEETS—SHEET 2.
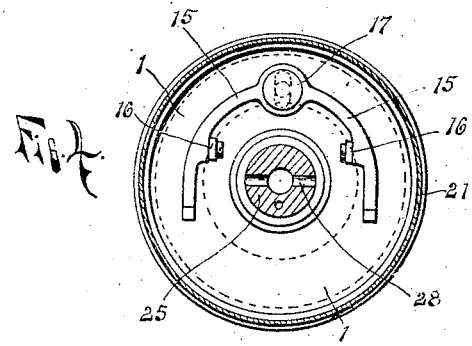
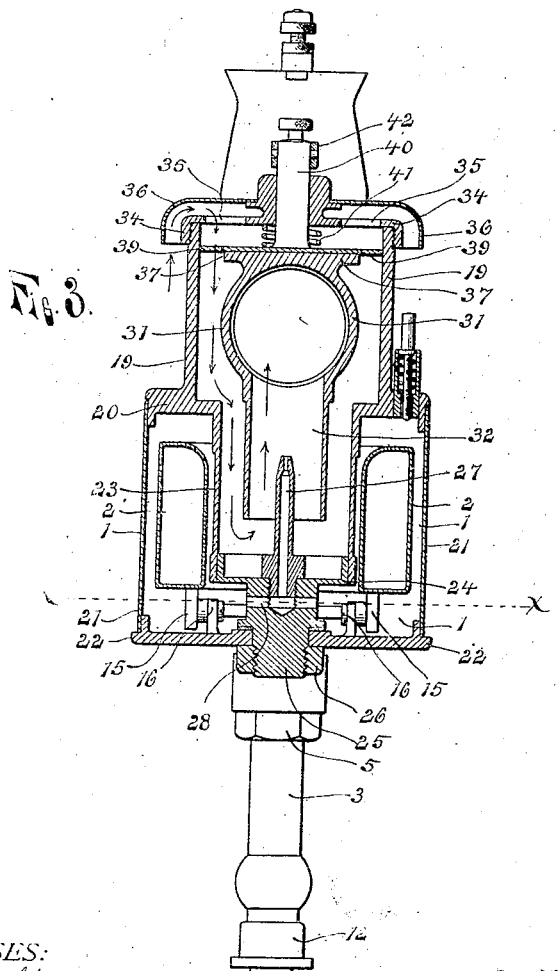
WITNESSES:
INVENTOR.
Walter L. Marr
BY
ATTORNEYS.

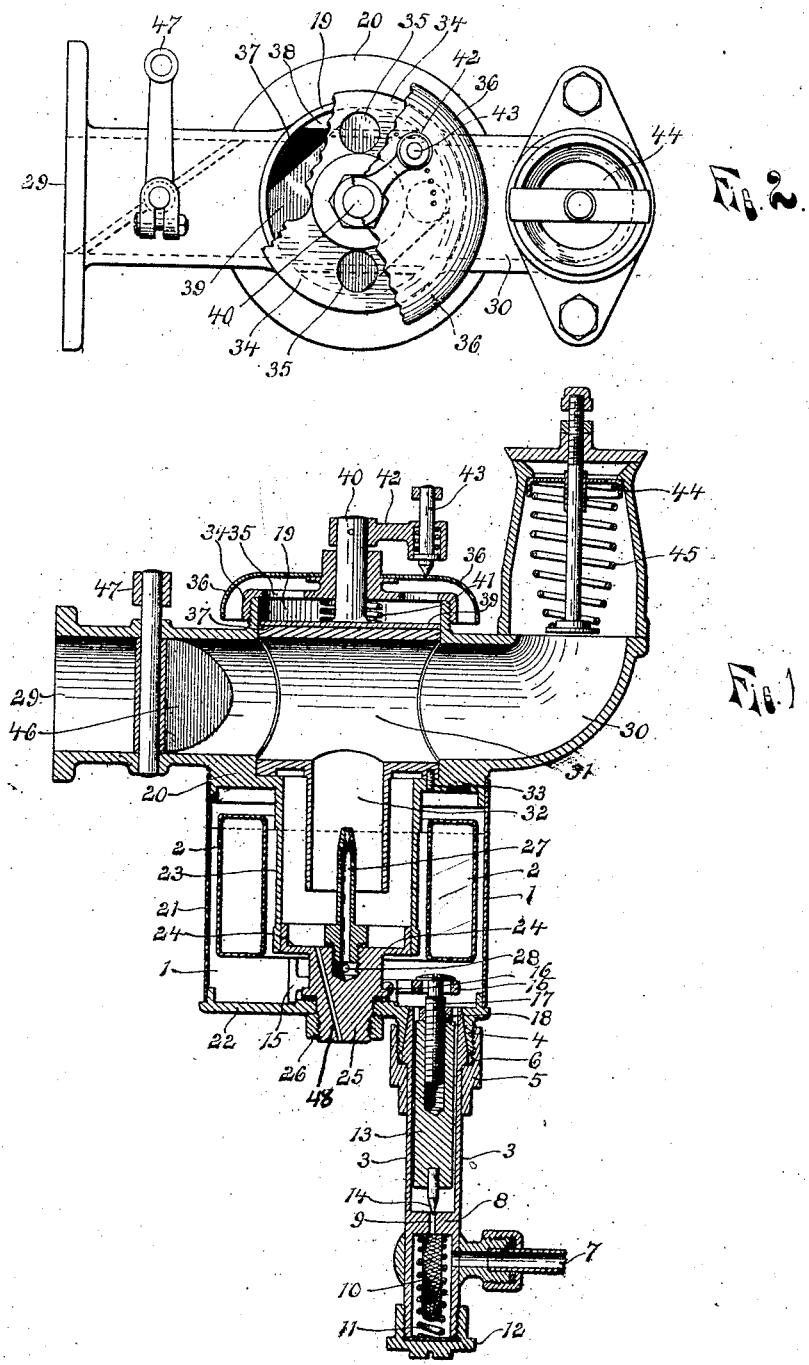

UNITED STATES PATENT OFFICE.

WALTER L. MARR, OF JACKSON, MICHIGAN.

CARBURETER

No. 888,526.

Specification of Letters Patent.

Patented May 5, 1908.

Application filed April 9, 1906. Serial No. 310,685.

*To all whom it may concern:*

Be it known that I, WALTER L. MARR, a citizen of the United States of America, residing at Jackson, in the county of Jackson and State of Michigan, have invented certain new and useful Improvements in Carbureters, of which the following is a specification, reference being had therein to the accompanying drawings.

This invention relates to improvements in carbureters of the float feed type and one of the objects of the invention is to so arrange the spray nozzle and mixing chamber with reference to the float chamber that the tipping of the device will not materially affect the level of the liquid in the nozzle and a very compact arrangement of parts is secured.

It is also an object of the invention to so construct the device as to make all parts readily accessible for cleaning and repair and to provide improved adjustable means for accurately regulating the inlet of air and gasolene to secure the proper mixture under ordinary running conditions.

A further object of the invention is to provide an auxiliary air inlet adapted to admit air when the speed of the engine is increased which inlet is so arranged relative to the mixing chamber that the inrushing air from said inlet, sweeps across the discharge end of said chamber, increasing the vacuum therein and thoroughly mixing with the mixture therefrom.

To this end the invention consists in the construction, arrangement and combination of parts, all substantially as hereinafter more fully described and particularly pointed out in the claims, reference being had to the accompanying drawings, in which Figure 1, is a longitudinal vertical section of a device embodying the invention; Fig. 2, a plan view of the same, with parts broken away to show the construction; Fig. 3, a transverse vertical section; and Fig. 4, a horizontal section on the line *x—x* of Fig. 3.

As shown in the drawings 1 is the float chamber, 2 the sheet metal float therein, and 3 a stand pipe secured to the bottom of the chamber by forming a tapering seat 4 in the bottom of the chamber to receive the tapered end of the stand pipe, an internally screw-threaded coupling 5 provided with a shoulder 6 to engage a shoulder on the stand pipe being provided to force said tapering end firmly to its seat and make a tight joint. A supply pipe 7 opens into the stand pipe near its lower end below a partition 8 therein formed with a passage 9, to the under side of which partition and over said passage, is secured one end of a tubular screen 10 by a coiled spring 11, one end of which clamps the edge of the screen between it and the partition, its opposite end engaging the removable cap 12 forming the lower end of the stand pipe. A settling chamber is thus formed in the lower end of the stand pipe, the screen which hangs downward within said chamber preventing any sediment from passing upward in the pipe, and this chamber and screen may be readily cleaned at any time by removing the cap, the removal of said cap releasing the spring which clamps the screen.

Within the upper end of the stand pipe is a plug or weight 13 of less diameter than the internal diameter of the pipe so that the gasolene may pass upward around it freely and on its lower end is a needle point 14 forming a valve to seat within the upper end of the passage 9 and stop the flow of gasolene to the float chamber above. In the bottom of the float chamber is a yoke lever 15 which is pivoted upon the bottom of said chamber intermediate its ends at 16 and is attached at one end to the plug 13 by an adjusting screw 17 engaging a slot therein to permit a free rocking movement of the lever. The opposite end of the lever is provided with a vertical extending lug to engage the bottom of the float so that as the gasolene is used out of the chamber and the float settles down, the lever will be rocked, lifting the needle point from its seat and admitting gasolene. The lift of the lever may be very accurately determined by the adjusting screw 17 and a lock nut 18 is provided thereon to hold the screw in its adjusted position.

The body of the device consists of a cast vertically extending cylindrical portion 19 formed at its lower end with a circular head 20 for the float chamber, provided with a downwardly extending flange to project into the upper end of the cylindrical sheet metal body 21 which is secured at its lower end to the lower head 22 of the chamber. Formed integral with the body portion or head 20 is a cylindrical portion 23 extending downward within the float chamber and forming an axial air chamber therein. The lower end of this air chamber is closed by a solid head 24 provided with a downwardly extending stud 25 having a reduced and externally screw-threaded end projecting through an axial opening in the lower head 22 of the float chamber. A nut 26 on this reduced end of the stud engages the outer side of the head to secure the same in place and detachably hold the parts together so that the float chamber may be readily taken apart for cleaning or repair.

An internally screw-threaded axial bore extends downward within the stud 25 a short distance to receive an upwardly extending nozzle member 27 and a transverse passage 28 is bored through the stud, through which passage the gasolene flows from the float chamber to the nozzle. The gasolene is maintained at a certain level in the float chamber by the float and it rises to and is maintained at substantially the same level to the nozzle regardless of the tipping of the float chamber as said nozzle is located in the axis of said chamber, and therefore the gasolene will not fall too low or overflow from the nozzle when the device is tipped about in ordinary use on an automobile and the device is made very compact by so locating the air chamber.

Extending laterally outward from one side of the cylindrical body 19 is a cylindrical pipe or passage 29 having a flange at its end by means of which it may be secured to the cylinder of an explosive engine in communication therewith, and extending laterally outward from said body in a diametrically opposite direction is an air intake pipe or passage
30. These passages 29 and 30 are connected to make a direct transverse passage through the vertically extending body 19, by a short tubular casting 31 formed to fit closely within said body and provided with a short tubular arm 32 extending at right angles thereto downward within the air chamber 23 and forming a mixing chamber, the end of the nozzle projecting upward therein a short distance. A small screw or pin 33 in the seat for said casting 31 engages a recess therein to hold the same from turning in its seat.

The upper end of the body 19 extends a short distance above the upper side of the casting 31 therein and is closed by a screw cap 34 provided with a series of openings 35 for the admission of air. Supported upon a hub on the cap at a distance above the openings is a shield 36 turned downward at its edge at a distance from the edge of the cap to form a tortuous passage for the air and keep out the dust and dirt. The said casting 31 is formed at its upper side with a flat seat 37 of less width than the diameter of the body 19 so that at each side thereof is an opening 38 for the downward passage of air around said casting and into the air chamber 23 below from which chamber it is drawn by the suction stroke of the engine cylinder into the passage 32 through the mixing chamber, past the nozzle, gasolene being at the same time drawn from the nozzle and taken up by the ingoing air.

To regulate the amount of air which will be drawn in through the openings 38, a plate or mutilated disk 39 is seated upon the seat 37 and provided with a stem 40 extending upward through an axial opening in the hub of the cap 34 by means of which it may be turned, a coiled spring 41 on said stem between the disk and cap, acting to hold said disk to its seat. An arm 42 is secured to the outer end of the stem and this arm carries a spring actuated catch 43 to engage a series of holes or notches in the shield 36 to hold the disk in the position to which it may be turned.

The outer end of the passage 30 is closed by an inwardly opening valve 44 held to its seat by an adjustable spring 45, the tension of which may be so regulated that said valve will open only when the suction of the engine is increased beyond a certain predetermined amount by the increased speed of the engine. When the engine is running at a slow speed air will be drawn in past the valve disk 39 only, but as this air is directed directly upward around the nozzle through a restricted passage or mixing chamber, it will take up the required amount of gasolene to sufficiently saturate the air, and when a high speed is attained a strong current of air is drawn in through the valve 44 and passes across the open upper end of the mixing chamber, thus aiding the flow from said chamber and thoroughly mixing therewith. The required increase in the amount of air as the speed increases is thus automatically secured without any change in the regulation.

In the discharge passage 29 is provided a winged or butterfly valve 46 to restrict the passage and control the admission of the charges to the cylinder, said valve being operated by an arm 47 secured upon the outer end of its stem, which arm is connected in any desired manner with a lever within reach of the operator.

48 indicates a drain or pin hole through the stud 25.

Having thus fully described my invention, what I claim is:—

1. In a carbureter, the combination with a float chamber, a float in said chamber, and means operated by the float for admitting liquid to said chamber, of an air chamber extending downward within the float chamber and closed at its lower end and open for the admission of air at its upper end, a nozzle member extending upward within the axis of the air chamber, a tubular member extending laterally from the air chamber and forming a passage adapted to lead to the engine cylinder, a member within the air chamber extending across the same and forming a continuation of said passage, a tubular mixing chamber formed integral with said last named member and extending downward within the air chamber, and means for regulating the admission of air to the air chamber.

2. In a carbureter, the combination with a float chamber, a float in said chamber, and means operated by the float for admitting liquid to the float chamber, of an air chamber, a member forming a transverse passage through said air chamber, a mixing chamber opening from said passage downward into the air chamber, a nozzle member communicating with the float chamber and extending into the lower open end of the mixing chamber, laterally extending members having passages forming a continuation of the said transverse passage, and a valve adapted to be opened by suction for admitting air to one end of said transverse passage.

3. In a carbureter, the combination with a float chamber, a float in said chamber, and means operated by said float for admitting gasolene to the float chamber, of a cylindrical body forming an air chamber extending downward in the axis of the float chamber and closed at its lower end, means for controlling the admission of air to its upper end, tubular members formed integral with said body and extending laterally in opposite directions therefrom, a cylindrical member fitting within the body to extend across the same and connect the tubular members to form a continuous passage through the body, a valve to close one end of said passage, a mixing chamber opening into said passage and extending downward within the air chamber, and a nozzle member communicating with the float chamber and extending upward in the axis of the air and mixing chambers.

4. In a carbureter, the combination with a float chamber, a float in said chamber, and means operated by said float for admitting gasolene to the float chamber, of a cylindrical body formed with an air chamber extending downwardly in the axis of the float chamber, a cap for the upper end of said body provided with openings for the admission of air thereto, a tubular member fitting within the body and extending across the same to form a transverse air passage therethrough, a tubular portion formed integral with said member and extending downward within the air chamber to form a mixing chamber, a nozzle member extending upward in the lower open end of the mixing chamber, a mutilated disk seated upon the upper side of the said tubular member within the body and forming a valve to regulate the admission of air, and means for turning said disk.

5. In a carbureter, the combination with a float chamber, a float in said chamber, and means operated by said float for admitting fluid to the chamber, of a cylindrical body forming an air chamber the lower end of which extends downward into the float chamber and formed with laterally extending tubular portions, a tubular member fitting within the body to connect the laterally extending tubular portions and form a continuous passage through the body, a valve to close one end of said passage adapted to be opened by suction, a mixing chamber formed integral with said tubular member and extending downward in the air chamber and open at its upper end into the said passage, a nozzle member extending upward from the bottom of the air chamber into the open lower end of the mixing chamber, a valve controlling the admission of air to the upper end of the body, and a butterfly valve in the said passage.

6. In a carbureter, the combination of a cylindrical body formed with laterally extending tubular portions, a member in said body connecting said tubular portions to form a transverse air passage through the body and formed with a seat at its upper side, a cap on the upper end of the body provided with holes for admission of air, a mutilated disk seated on the said seat and provided with a stem extending through the cap, a shield supported over the holes and formed with a downwardly turned edge, an arm on the stem, and means carried by the arm to hold the same in the position to which it is turned.

In testimony whereof I affix my signature in presence of two witnesses.

WALTER L. MARR.

Witnesses:
 WM. C. DURANE,
 H. E. SHILAND.